United States Patent Office 3,283,161
Patented Nov. 1, 1966

3,283,161
FULLY AUTOMATIC CONTROL DEVICE FOR ILLUMINATING LAMPS OF MOTOR VEHICLES
Susumu Ubukata, Chikusa-ku, Nagoya-shi, Michio Yashima, Imamura-cho, Anjo-shi, Takeo Ito, Higashi-ku, Nagoya-shi, and Eiichi Takada, Nakamura-ku, Nagoya-shi, Japan, assignors to Susumu Ubukata, Nagoya-shi, Japan
Filed Sept. 5, 1963, Ser. No. 306,916
Claims priority, application Japan, Sept. 8, 1962, 37/37,716; Sept. 24, 1962, 37/42,069; Dec. 29, 1962, 37/59,751; Mar. 16, 1963, 38/14,428
12 Claims. (Cl. 250—214)

This invention relates to a fully automatic control device for illuminating lamps for use in vehicles, more particularly motor vehicles, characterized in that on-off and switching operations of such illuminating lamps are effected automatically in response to several conditions such as the intensity of outdoor illumination, the intensity of illumination coming from an approaching vehicle, running and stopping of the vehicle on which the device is installed.

Generally, the most frequently used lamps of a vehicle (hereinafter referred to as a car) are the main and auxiliary head lamps, side lamps and tail lamps and the like (including tail lamps, instrument lamps and number plate lamps), and on-off and switching operations of these lamps are accomplished as follows under various conditions. More particularly, when the intensity of the outdoor illumination is decreased as at daybreak or nightfall (hereinafter generally termed twilight), it is usual to light the side and tail lamps of the car, and when the intensity of the outdoor illumination is further decreased at night, the side lamps are switched to head lamps. Also when a car is running at night, the main head lamps are switched to the auxiliary head lamps in order to prevent glare to the drivers of a approaching cars coming from the opposite direction, and when the approaching cars have passed by, the main head lamps are again turned on. Also at night when a car is stopped to await traffic signal change the head lamps are switched to side lamps in order to prevent glare to the drivers of other cars. These controls for car lamps are usually accomplished by the hand or foot of the driver and must be effected very frequently, especially in city areas. Recently, a control device has been developed wherein a portion of said operations is accomplished automatically, but as far as the applicant is aware, no satisfactory fully automatic control device has been developed.

It is therefore the principal object of this invention to provide a fully automatic control device for various illuminating lamps of vehicles, especially motor vehicles, which can enable the driver to operate his car safely at night by driving operations similar to those in the daytime under appropriate illuminating conditions.

A further object of this invention is to provide a novel device responsive to the stopping condition of a car to selectively operate various lamps of the car.

A still further object of this invention is to provide a novel device which can operate instantly, irrespective of gradual change in the intensity of outdoor illumination.

Briefly stated, this invention can be practiced by providing a stopping responsive device operated by a switch which discriminates between the stopping and running conditions of a car, a first device controlled by a photocell device responsive to a normal intensity of nighttime illumination, a second photocell-controlled device responsive to the intensity of outdoor illumination, a third photocell for the intensity of illumination of on-coming cars, a change-over switch adapted to selectively connect one of the second and third photocells to said second photocell-controlled device, and means to control said change-over switch in response to the operation of either said stopping responsive device or said first photocell-controlled device. Since the stopping responsive device and the first photocell-controlled device are so interrelated that one of them can operate only when the other is operated, they may be combined as a single unit.

With this arrangement, the second photocell-controlled device is connected to the third photocell for the intensity of illumination of on-coming cars only when the car is running and when the intensity of outdoor illumination is less than a predetermined intensity of nighttime illumination, but said second photocell-controlled device is connected to the second photocell for the intensity of twilight illumination in other cases, thus controlling various illuminating lamps, for example, main and auxiliary head lamps, side lamps, tail lamps, number plate lamps, instrument lamps, etc. of a car in any desired manner.

The features of the invention which are believed to be novel are set forth with particularity in the appended claims. The invention itself, however, as to its organization together with further objects and advantages thereof, may best be understood by reference to the following description taken in connection with the accompanying drawings, in which like parts are designated by like reference numerals, and in which:

Figure 1:
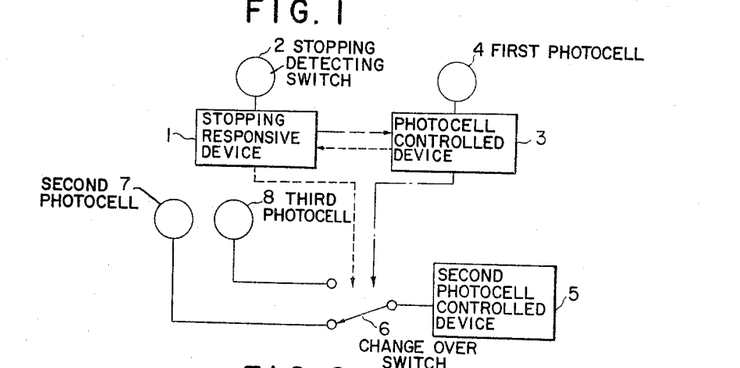
FIGS. 1, 2, and 3 are block diagrams of automatic control systems for car lamps, presented to facilitate understanding of the principle of this invention.

Referring now to FIG. 1 of the accompanying drawings, there is shown a stopping responsive device 1 which is controlled by signals supplied from a stopping detecting switch 2 which repeats switching operations when the car is running and which discriminates between stopping and running of the car. There is also shown a photocell-controlled device 3 with a third photocell 4 for the intensity of nighttime outdoor illumination. Further, there is provided a second photocell-controlled device 5 which is normally connected to a second photocell 7 for the intensity of outdoor illumination by way of a change-over switch 6 but is connectible by said switch 6 to a third photocell 8 for the intensity of illumination of on-coming cars. The second photocell-controlled device 5 responds to the normal intensity of twilight outdoor illumination when it is connected to the photocell 7 and responds to the intensity of illumination of an on-coming car when it is connected to the photocell 8. As shown by dotted lines, the change-over switch 6 appears to be actuated either by the operation of the stopping responsive device 1 or the photocell-controlled device 3, but it is to be understood that these devices 1 and 3 are so interrelated that one of them can operate only when the other has completed its operation. For example, only when the car is running, and the stopping responsive device 1 is in operating condition, the photocell-controlled device 3 can respond to the intensity of nighttime illumination, whereby said device operates to move said change-over switch 6 to switch the device 5 from the second photocell 7 to the third photocell 8 when the intensity of outdoor illumination is below a predetermined nighttime value. It is, of course, possible to combine devices 1 and 3 so that only when the photocell-controlled device 3 responds to a value below the predetermined intensity of nighttime illumination, the stopping responsive device 1 can operate to detect the running and stopping conditions of the car, thereby to operate said change-over switch 6 when the device 1 has operated in response to the running condition.

Figure 2:
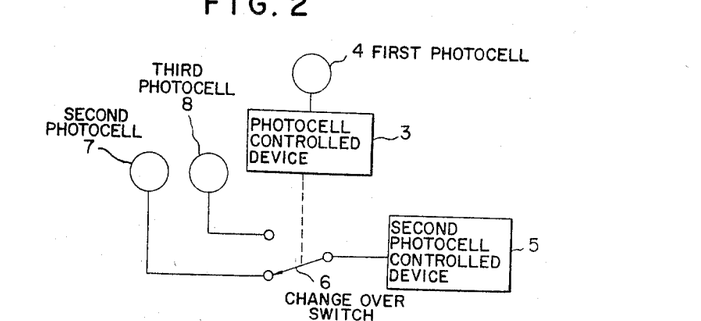

FIG. 2 is a basic block diagram similar to FIG. 1 except that said stopping responsive device 1 and the stopping detecting switch 2 are omitted. In this modification, the second photocell-controlled device 5 is normally connected to the photocell 7 for the intensity of twilight outdoor illumination to respond to the intensity of the normal intensity. When the third photocell-controlled device 3 responds to a value below the predetermined intensity of nighttime illumination the change-over switch 6 is actuated by said first photocell-controlled device 3 to connect the second photocell-controlled device 5 to the third photocell 8 for the intensity of illumination of on-coming cars to respond thereto.

Figure 3:
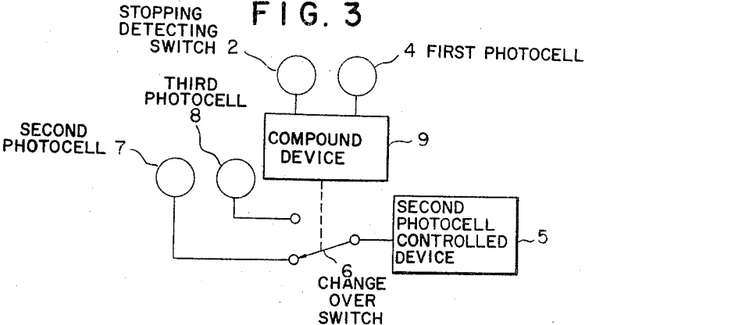

FIG. 3 shows a still further modification of FIG. 1 wherein the stopping responsive device 1 and the first photocell-controlled device 3, shown in FIG. 1, are combined into a compound device 9, having the same function as in the arrangement of FIG. 1. More particularly, the compound device 9, actuating changeover switch 6, is designed to respond to a value below the predetermined intensity of nighttime illumination only when the car is running but cannot so respond when the car is stopped. Then the device 5 will be connected to the second photocell 7 for the intensity of outdoor illumination by changeover switch 6 when said condition is not satisfied, that is, when the compound device 9 does not operate but is connected to the third photocell 8 for the intensity of illumination of on-coming cars by changeover switch 6, only when the compound device 9 is operating.

Various embodiments of this invention will now be described in more detail hereinbelow.

Figure 4:
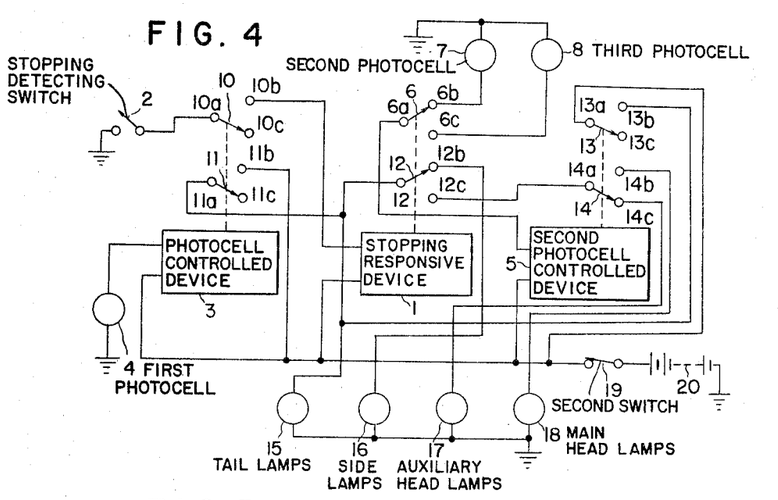
FIGS. 4, 5, 6, 7, 8 and 9 are connection diagrams of different embodiments of this invention based on the principles shown in FIGS. 1, 2 and 3.

FIG. 4 illustrates one embodiment based on the principle shown in FIG. 1 wherein switching is accomplished by contacts of electromagnetic relays. Various components shown in FIG. 4 are in the condition when the intensity of the outdoor illumination is equal to the intensity of daytime illumination. Throughout the drawings, like parts are indicated by the same reference numerals. In this embodiment, the first photocell-controlled device 3 is shown as including an electromagnetic relay having two movable contacts 10 and 11, and the stopping responsive device 1 and the second photocell-controlled device 5 are shown as including electromagnetic relays having pairs of movable contacts 6, 12 and 13, 14 respectively. Numerals with suffix (*a*) indicate pivots of corresponding movable contacts, those with suffix (*b*) designated stationary contacts engageable by corresponding movable contacts when the associated relays are deenergized, and those with suffix (*c*) indicate stationary contacts engageable by corresponding movable contacts when the relays are energized. Photocells 4, 7 and 8 for the intensity of illumination of the respective photocell-controlled device may be photoconductors such as cadmium sulfide. Tail lamps, side lamps, auxiliary head lamps, and main head lamps are respectively shown by reference numerals 15, 16, 17 and 18. A source of electric power shown as a battery 20 is provided to energize these lamps and relays through a source switch 19 which may be interlocked with an ignition switch, not shown. It is to be understood that the photocell-controlled devices are so designed that when the intensity of illumination to which photocells 4, 7 and 8 are subjected is high, the electromagnetic relays of the respective photocell-controlled devices 3 and 5 are energized, whereas when said intensity of illumination is low, the relays are deenergized, and the electromagnetic relay of the stopping responsive device 1 is deenergized when no signal is supplied thereto from the stopping detecting switch 2, whereas it will be energized when it is supplied with such signals. Therefore, during daytime, the intensity of light on the photocells 4 and 7 for the intensity of outdoor illumination is high enough to energize the relays of the devices 3 and 5, and at this time the relay of the stopping responsive device 1 is deenergized by being disconnected from the stopping detecting switch 2, thus deenergizing various illuminating lamps, when the intensity of the outdoor illumination is decreased to a value below a predetermined intensity of twilight illumination, the resistance of the second photocell 7 for the intensity of outdoor illumination will be increased to decrease, either directly or by means of a suitable amplifier, the electric current to deenergize the electromagnetic relay of the device 5 thus throwing the movable contacts 13 and 14 to the stationary contacts 13b and 14b, respectively. Thus tail lamps 15 and side lamps 16 are turned on. When the intensity of outdoor illumination is further decreased down to the predetermined intensity of nighttime illumination, the resistance of the first photocell 4 for the intensity of outdoor illumination is also increased to decrease, directly or by means of a suitable amplifier, the electric current to deenergize the electromagnetic relay of the first photocell-controlled device 3. Thus, the movable contacts 10 and 11 are thrown to the stationary contacts 10b and 11b, respectively, to connect the stopping detecting switch to the stopping responsive device 1 and to maintain energization of the tail light 15. Accordingly, when the car is running, the operation of the switch 2 results in the energization of the electromagnetic relay of the stopping responsive device 1 to close the movable contacts 6 and 12 against the stationary contacts 6c and 12c, respectively. Thus, device 5 will be operated by the intensity of illumination of on-coming cars because it is connected to the third photocell 8, but in the absence of any on-coming car, the electromagnetic relay of the second device 5 will be deenergized to throw the movable contacts 13 and 14 to the stationary contacts 13b and 14b, respectively, thus lighting the main head lamps 18. When there are one or more on-coming cars and when the third photocell 8 detects the intensity of illumination of the on-coming cars, the electromagnetic relay of the second device 5 is energized to throw the movable contacts 13 and 14 to the stationary contacts 13c (idle contact) and 14c, respectively, to light the auxiliary head lamps. On the other hand, if the car is stopped, switch 2 deenergizes the electromagnetic relay of device 1, thus throwing the movable contacts 6 and 12 to the stationary contacts 6b and 12b, respectively. In this case, since the second photocell-controlled device 5 is connected to photocell 7 for the intensity of outdoor illumination, and since the movable contact 12 is engaging the stationary contact 12b, side lamps 16 will be lighted, but the head lamps will be extinguished.

The above described operations are similarly accomplished when the intensity of the outdoor illlmination changes from the nighttime condition to the daytime condition through the daybreak condition. More particularly, when the condition is varied from nighttime illumination to daybreak illumination while the car is running, the photocell-controlled device 3 is first energized above the predetermined nighttime illuminating value to disconnect the stopping detecting switch 2 of the stopping responsive device 1 to deenergize the electromagnetic relay thereof, thus switching the head lamps to the side lamps. When the intensity of the outdoor illumination is further increased, the relay of device 5 will be energized to extinguish all illuminating lamps.

It is to be understood that the predetermined intensities of illumination mentioned above and used hereinafter are set as follows. When the intensities of illumination decrease; the predetermined intensity of twilight illumination to turn on side lamps and tail lamps is, for example, 100 luxes, the predetermined intensity of night-time illumination to turn on head lamps and turn off side lamps is, for example, 20 luxes; and the predetermined intensity of the light from on-coming cars; said intensity to turn on main head lamps, is, for example, 0.1 lux. When the the intensity of illumination increases; the predetermined intensity of the light from on-coming cars, said intensity to turn on the auxiliary head lamps and turn off main head lamps, is, for example, 0.2 lux, the predetermined intensity of night-time illumination to turn off head lamps and turn on side lamps is, for example, 50 luxes, and the predetermined intensity of twilight illumination to turn off all lamps is, for example, 200 luxes.

The apparatus is constructed so that the second photocell 7 or the third photocell 8 can be connected to the photocell-controlled device 5. The predetermined illumination at which the photocell-controlled device 5 operates in the case of connection of device 5 with the second photocell 7 is considerably greater than the illumination at which device 5 operates in the case of its connection with the third photocell 8. For the sake of adjusting the difference between the inputs at the instants when the photocell-controlled device 5 operates in response to the above-mentioned predetermined illuminations of both kinds, there are various systems such as, for example, the system in which the light from on-coming vehicle is concentratively radiated onto the light receiving surface of the photocell 8 by way of a focussing lens (not shown in the drawing) or a system in which sensitivity of the third photocell 8 is higher than that of the photocell 7.

Figure 5:
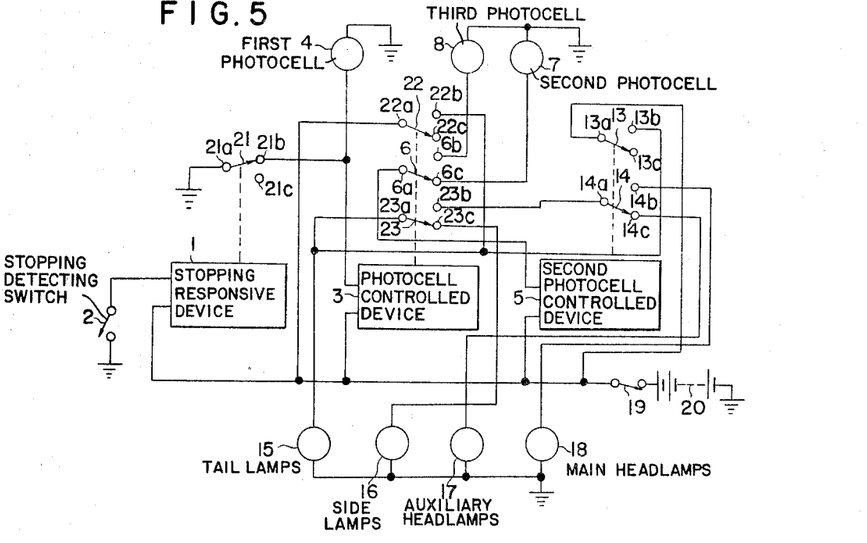

FIG. 5 shows another embodiment based on the principle shown in FIG. 1 which utilizes electromagnetic relays. Corresponding parts of FIGS. 4 and 5 are designated by the same reference numerals. In this embodiment, the switch 21 is arranged to be operated by the electromagnetic relay, not shown, of the stopping responsive device 1. Movable contacts 22, 6 and 23 are operated by the electromagnetic relay of the first photocell-controlled device 3, while movable contacts 13 and 14 are operated by the electromagnetic relay of the second photocell-controlled device 5, both of which operate in the same manner as has been described in connection with FIG. 4. As shown in the drawing, in this embodiment, the operation of the stopping responsive device 1 controls the operation of device 3 which responds to the normal intensity of nighttime illumination to control the connection between the second photocell-controlled device 5 and photocells 7 and 8. Thus, when the car is stopped, the opening and closing operations of the stopping detecting switch 2 are stopped thereby to deenergize the electromagnetic relay of the stopping responsive device 1 so that the movable contact 21 is closed against the stationary contact 21b to short circuit first photocell 4 for the intensity of outdoor illumination. Accordingly, the relay of said responsive device 3 is maintained energized irrespective of the intensity of the outdoor illumination, thereby to close the movable contact 6 against the stationary contact 6c, thus connecting device 5 to photocell 7 for the intensity of outdoor illumination. On the other hand, when the car is running and the movable contact 21 is disengaged from the stationary contact 21b to break the short circuit around photocell 4 for the intensity of outdoor illumination, device 3 resumes normal responsive function. Therefore, the relay thereof is maintained energized until the intensity of the outdoor illlumination is decreased to a value below the predetermined intensity of nighttime illumination. When this intensity is reached, the relay is deenergized to change the connection between photocells 7 and 8 and the device 5. Thus, again in this embodiment, the lighting, extinguishing and switching operations of the various illuminating lamps are accomplished automatically in response to the running, and stopping of the car and to the change in the intensity of the outdoor illumination, and to the illumination from oncoming cars.

Figure 6:
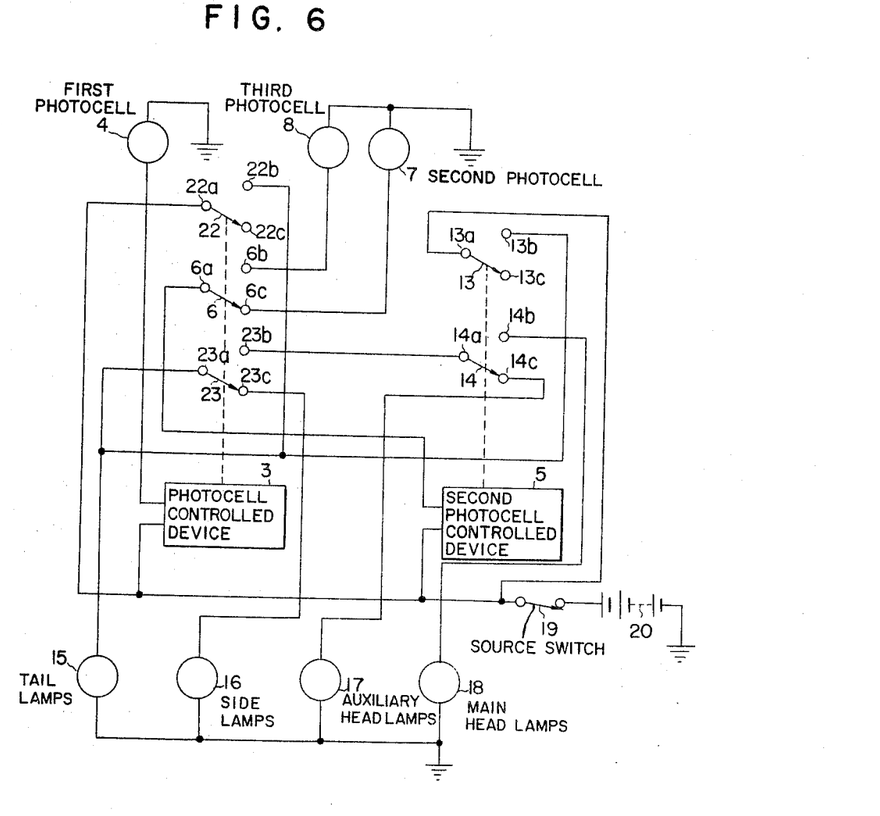

FIGURE 6 shows a further modification of this invention based on the principle shown in FIG. 2, wherein the stopping responsive device and the stopping detecting switch of the second embodiment have been eliminated. Thus, in this embodiment, since the first photocell 4 for the intensity of nighttime illumination is always connected to the first photocell-controlled device 3 irrespective of whether the car is running or stopped, the device 3 will always have the normal response capability, so that when the intensity of the outdoor illumination is above the predetermined intensity of nighttime illumination, the electromagnetic relay of device 3 is energized, whereas when the intensity of outdoor illumination is below the predetermined intensity of nighttime illumination, said relay is deenergized, thus changing the connection between the second photocell-controlled device 5 and the second photocell 7 and third photocell 8. In this way, this embodiment controls all illuminating lamps of a car in response to the variation in the intensity of the outdoor illumination and also to the intensity of illumination of on-coming cars in just the same manner as the second embodiment except for the switching operation from head lamps to side lamps in response to the running and stopping of the car.

Figure 7:
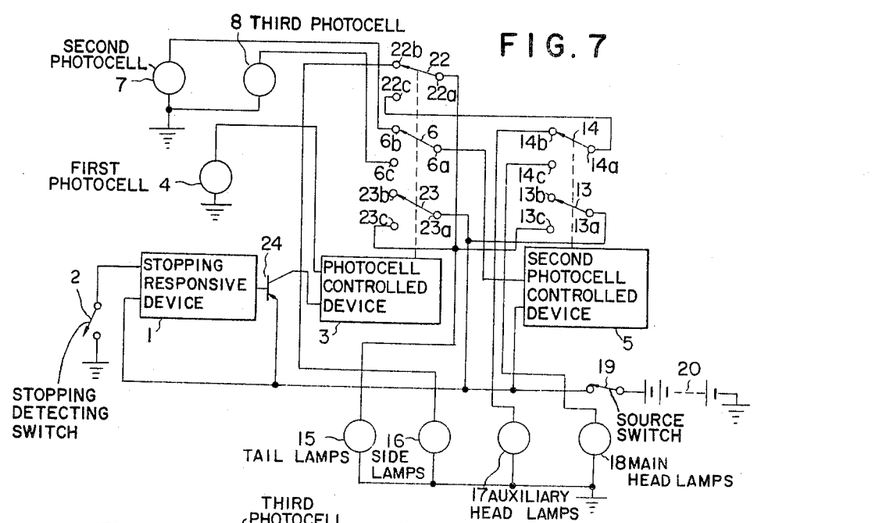

FIG. 7 shows a fourth embodiment of this invention, based on the principle shown in FIG. 1, in which 24 designates an output transistor of the stopping responsive device, and the other components are designated by the same reference numerals as in the preceding embodiments. However, this embodiment is different from the first, second, and third embodiments in that the electromagnetic relays of the first and second photocell-controlled devices are so arranged as to be energized when the intensity of illumination is low but to be deenergized when the said intensity is high and the electromagnetic relay of device 1 is replaced by a transistor 24. In this embodiment, operation of the stopping detecting switch 2 causes the transistor 24 to conduct so as to connect device 3 to battery 20, thus setting the device 3 in its operable condition. On the other hand, when the stopping detecting switch 2 is in its stopped condition, the transistor 24 is turned off to deenergize device 3, it being understood that the connection between device 5 and photocells 7 and 8 is controlled by the operation of device 3. Accordingly, when the intensity of the outdoor illumination corresponds to that of daytime, the devices 3 and 5 are deenergized, as shown in FIG. 7 irrespective of whether the car is running or is stopped, thereby extinguishing all of the illumination lamps. When the intensity of the outdoor illumination is decreased below the predetermined intensity of twilight illumination, the relay of the device 5, which is now connected to photocell 7 for the intensity of outdoor illumination, is energized to throw its movable contact 13 to the stationary contact 13c to light the tail lamps 15 and side lamps 16. When the intensity of the outdoor illumination is further decreased to that of the predetermined nighttime illumination, the stopping responsive device 1 responds to the running condition of the car to cause the transistor 24 to conduct, thereby to energize device 3 with current from battery 20. Thus, in response below the predetermined intensity of nighttime illumination, the first device 3 energizes its relay to throw its movable contacts 22, 6 and 23 to the stationary contacts 22c, 6c and 23c, respectively. Thus, the second device 5 is switched to the third photocell 8 for the intensity of illumination of on-coming cars. In the absence of any on-coming car, the tail lamps 15 and the main head lamps 18 are energized, and when an on-coming car approaches and its intensity of illumination reaches the normal value, device 5 is deenergized to switch the main head lamps 18 to the auxiliary lamps 17 while maintaining the tail lamp 15 energized. Stopping of the car results in the deenergization of device 3 to light the side lamps 16 and to extinguish the head lamps.

Figure 8:
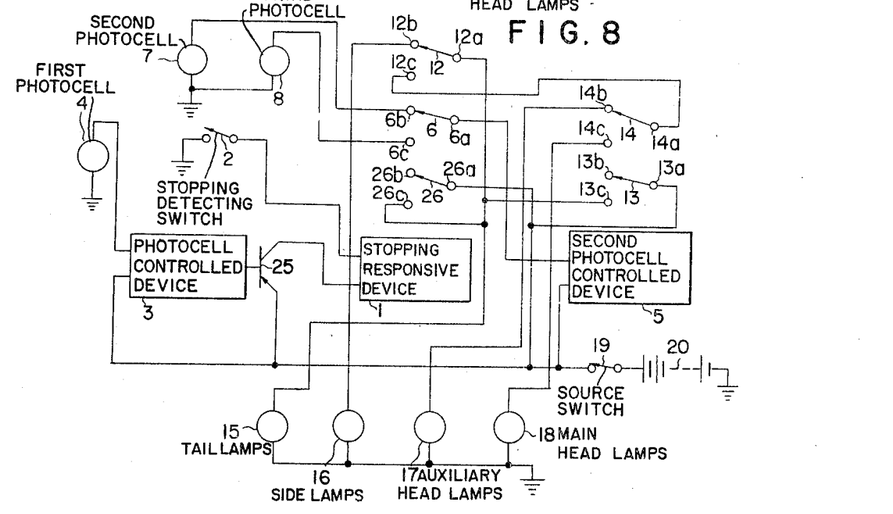

FIG. 8 shows a fifth embodiment of this invention, also based on the principle shown in FIG. 1. Like the fourth embodiment, the on-off operations of a transistor control the succeeding devices. In this case, when device 3 responds to the predetermined intensity of nighttime illumination to turn on the output transistor 25, the stopping responsive device 1 is connected to the battery, and the operation of the illumination control device is the same as that described above in connection with the fourth embodiment.

Figure 9:
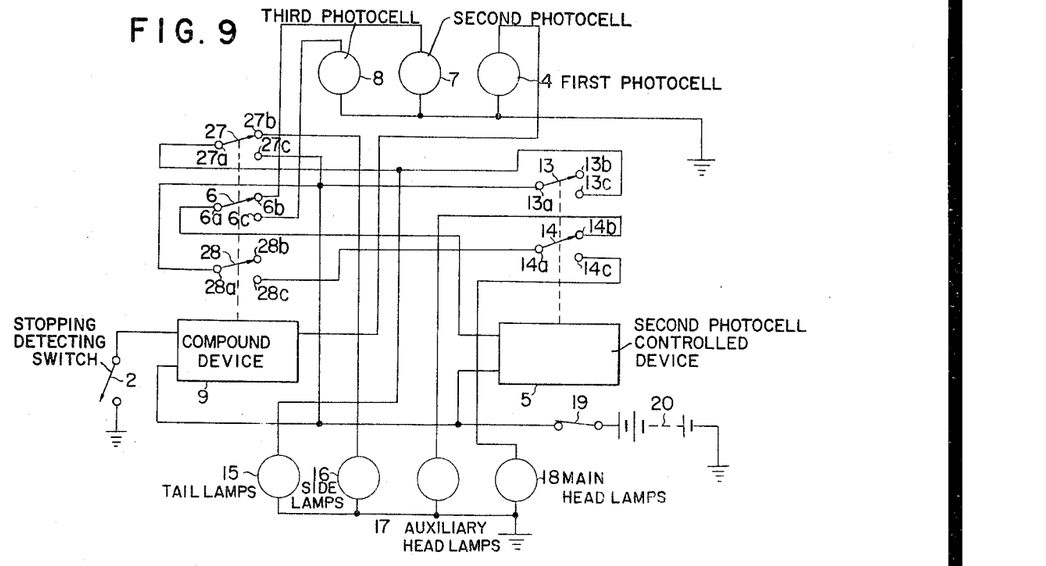

FIG. 9 shows a sixth embodiment of this invention, based on the principle shown in FIG. 1. In this embodiment, the compound device 9 replaces devices 1 and 3. Device 9 is connected to switch 2 and first photocell 4 and functions below the predetermined intensity of nighttime illumination only during running. During stopping, device 9 ceases to operate.

The compound device 9 controls the connection between device 5 and photocells 7 and 8. Thus, when it is so designed and connected as shown that the electromagnetic relay of the responsive device 9 is energized only when the intensity of outdoor illumination decreases to below the predetermined value of nighttime and when the car is running, then, when the intensity of outdoor illumination is that of the daytime illumination, the relays of both, devices 9 and 5 are deenergized to extinguish all lamps. When the outdoor illumination decreases to below the predetermined intensity of twilight illumination, the relay of device 5 is energized to throw its movable contacts 13 and 14 to the stationary contacts 13c and 14c, thereby lighting the tail lamps 15 and the side lamps 16. When the intensity of outdoor illumination decreases to below the predetermined intensity of nighttime illumination while the car is running, the relay of the compound device 9 is energized to throw its movable contacts 27, 6 and 28 to the stationary contacts 27c, 6c and 28c, respectively, thereby switching the device 5 from photocell 7 to photocell 8 to respond to the illumination of oncoming cars. As an on-coming car approaches, and the third photocell 8 detects the predetermined intensity of illumination of the on-coming car, the second photocell-controlled device 5 deenergizes a relay associated therewith to throw the movable contacts 13 and 14 to the stationary contacts 13b (idle) and 14b to light the auxiliary head lamps 17 and extinguish main head lamps 18. When there is no on-coming car, or the intensity of illumination of an on-coming car is below the normal value, the relay of device 5 is energized to throw the movable contacts 13 and 14 to the stationary contacts 13c and 14c, respectively, thereby lighting the main head lamps 18 and extinguish lamps 17. Even when the intensity of illumination is at the nighttime condition, stopping of the car causes the relay of the compound device 9 to be deenergized to throw the movable contacts 27, 6 and 28 to the stationary contacts 27b, 6b and 28b (idle), respectively, thereby connecting device 5 to photocell 7 to light the side lamps 16 and extinguish the head lamps.

As has been described above in connection with various embodiments, this embodiment comprises, as its essential components, a stopping responsive device, a first photocell-controlled device which responds to the predetermined intensity of nighttime illumination, and a second photocell-controlled device which responds to the predetermined intensity of twilight illumination or of the illumination of on-coming cars or a compound device. In the following description, examples of these essential components will be considered in detail.

Figure 10:
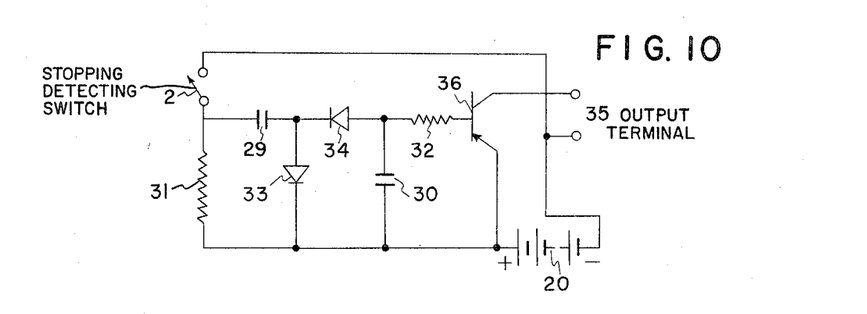
FIGS. 10 and 12 are connection diagrams showing examples of the stopping responsive device according to this invention.
Figure 11:
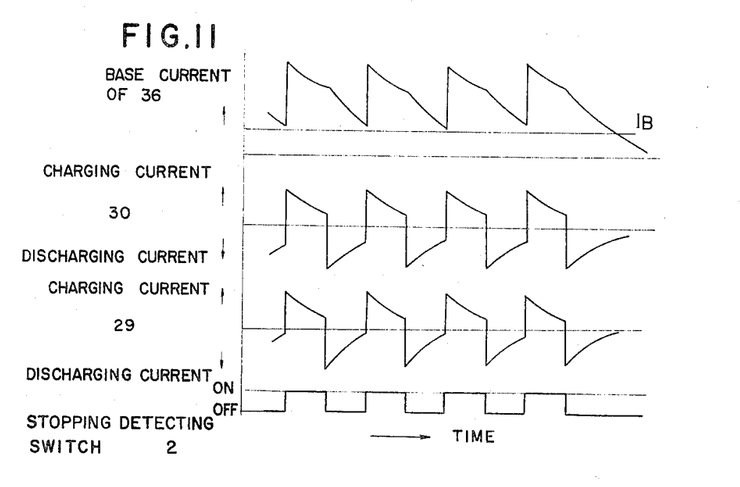
FIG. 11 is a graphical representation showing time-current curves of the device shown in FIG. 10.
Figure 12:
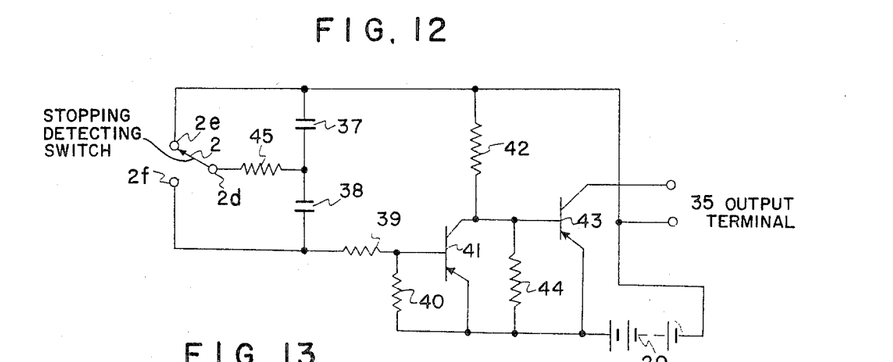

FIGS. 10 and 12 show examples of the stopping responsive device, and FIG. 11 shows curves of operating currents of the device shown in FIG. 10. In FIG. 10 there are shown two capacitors 29 and 30 adapted to be charged and discharged through diodes 33 and 34 in response to the closing and opening (make or break) operations of the stopping detecting switch 2 which repeats switching operations while the car is running. 31 and 32 indicate resistors, while 35 shows output terminals across which is normally connected an electromagnetic relay, not shown in the drawing. It is to be understood that this relay is energized when a transistor 36 is conducting but is deenergized when the transistor is nonconducting. Since the switch 2 is repeatedly opened and closed during running of the car, in the interval when the switch 2 is closed, a capacitor charging current flows through a circuit that can be traced from the positive pole of battery 20, through the emitter and base electrodes of the transistor 36, through the resistor 32, diode 34, capacitor 29, and switch 2 to the negative pole of the battery 20. Charging current will also flow through the capacitor 30 in parallel with the emitter and base electrodes of the transistor 36 and the resistor 32 in series therewith. On the other hand, when the switch 2 is opened, capacitor discharge currents will flow, respectively, through one circuit including the capacitor 30, the emitter and base electrodes of the transistor 36, and the resistor 32, and through another circuit including the capacitor 29, the diode 33 and the resistor 31. Thus, it will be clear that the base current of the transistor will always flow so long as the switch 2 is interrupted at a suitable frequency. In this case the base current of the transistor 36 causes the collector current to flow, thus energizing the relay connected cross terminals 35. The operation, when the car stops with the switch 2 opened or closed will now be considered. Then, as the capacitors 29 and 30 charge and discharge, the collector current of the transistor 36 is decreased to de-energize the relay connected across the output terminals 35. These operations will be obvious to those skilled in the art by an inspection of the current curves shown in FIG. 11.

Referring now to FIG. 12, two capacitors 37 and 38 of substantially equal capacitances, two transistors 41 and 43, resistors 39, 40, 42, 44 and 45, and a stopping detecting switch 2 are connected as shown. When the switch 2 stays on the stationary contact 2e, the capacitor 38 is charged by the battery 20 through the resistors 40, 39 and 45 and the transistor 41, and the capacitor 37 is discharged through the resistor 45.

In this case, the base current of transistor 41 does not flow or, in other words, the transistor is cut off. Thus sufficient base current of transistor 42 can flow to cause enough collector current to flow and to maintain the electromagnetic relay across output terminal 35 in energized state. Now, when the switch 2 is thrown to stationary contact 2f when starting the vehicle, the charging current of the capacitor 37 flows from the battery 20 through the base electrodes of the transistor 41, the resistors 40, 39 and 45, whereby the base current of transistor 43 is cut off and the resistor 43 de-energizes the electromagnetic relay. In the meantime the capacitor 38 is quickly discharged due to the low resistance of the resistor 45. Thus when the switch 2 is detached from contact 2f before charging of capacitor 37 is completed, the base current of the transistor 401 is not reduced so as to cause the transistor 43 to conduct enough collector current to energize said relay because the charging current of capacitors 37 and 38 in series can still flow, and the reengagement of switch 2 and contact 2e will cause the charging current of capacitor 38 to flow whereby the deenergization of the relay will be maintained. Therefore, if the switching operation of switch 2 is repeated at suitable intervals, the relay is deenergized while the vehicle is running. When the repeating action of switch 2 is stopped as the car stops, the base current and hence the collector current of the transistor 41 are decreased as the capacitor 37 or 38 is charged to render the transistor 43 conductive, thereby energizing the relay connected across the output terminals 35.

As has been described above in connection with FIGS. 10 and 12, in the stopping responsive device of this invention, the operation of the stopping detecting switch 2 and the charging and discharging of two capacitors are utilized to turn transistors on and off as well as to energize and deenergize an electric relay.

Referring now to FIGS. 13, 14, 16 and 17, several examples of the photocell-controlled device are shown which may be used as devices 3 or 5.

Figure 13:
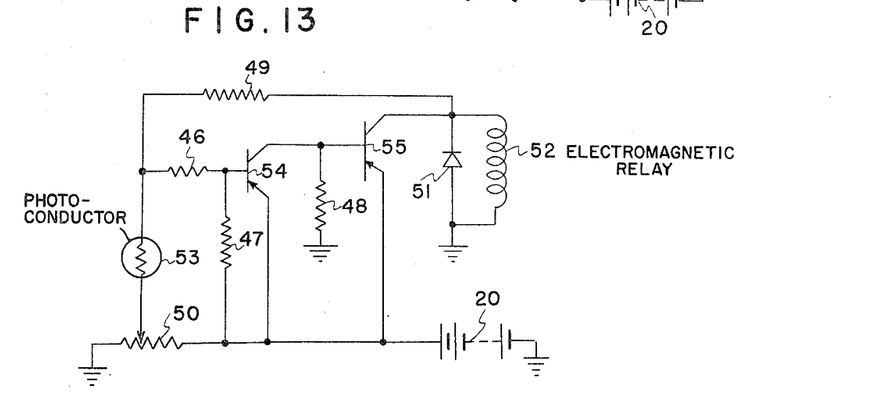
FIGS. 13, 14, 16 and 17 are connection diagrams illustrating example of the photocell-controlled device according to this invention.

FIG. 13 shows a photocell-controlled device including an amplifier with switching characteristic wherein reference numeral 53 indicates a photoconductor, which, in this example, corresponds to the photocell for the intensity of outdoor illumination or that of on-coming cars. 54 and 55 are transistors, 49 a resistor constituting a positive feedback circuit, 52 an electromagnetic relay, and 51 a diode to protect the transistor 55 against the counter E.M.F. of said relay 52. The device further comprises resistors 46, 47 and 48 and a resistor 50 for adjusting the sensitivity. With this connection gradual decrease in the intensity of illumination results in the gradual increase in the resistance value of the photoconductor 53 to gradually decrease the base current and hence the collector current of the transistor 54 when the intensity of illumination attains the predetermined value. As a result, the base current of the transistor 55 is increased to increase its collector side potential, which potential is fed back in the positive direction through said feedback circuit to increase the base potential of the transistor 54, thereby to decrease the collector current of the transistor 54. This will cause the base current and hence the collector potential of the transistor 55 to increase thereby rendering the transistor 54 nonconducting and the transistor 55 conducting in an accelerated manner, thus completing the switching operation. Upon gradual increase in the intensity of the illumination the resistance of the photoconductor 53 gradually decreases to cause gradual increases in the base current and hence the collector current of the transistor 54 when the predetermined intensity of illumination is reached. As a result, the base current and the collector current of the transistor 55 are decreased to create a potential drop which serves to decrease the base potential of the transistor 54 through the feedback action to further increase the collector current of the transistor 54 until abruptly the transistor 54 becomes conductive, and the transistor 55 is cut off. Thus, a photocell-controlled device having a switching function is especially suitable for such applications as that in conjunction with this invention wherein accurate response is to be made at a predetermined normal intensity of outdoor illumination.

Figure 14:
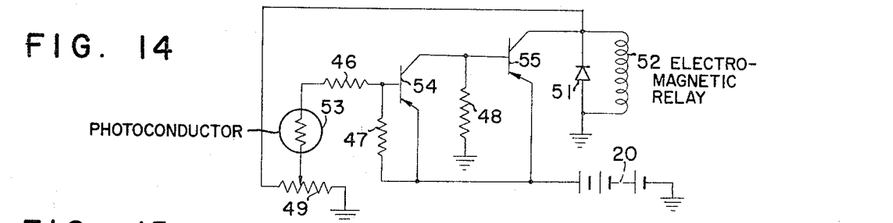
Figure 15:
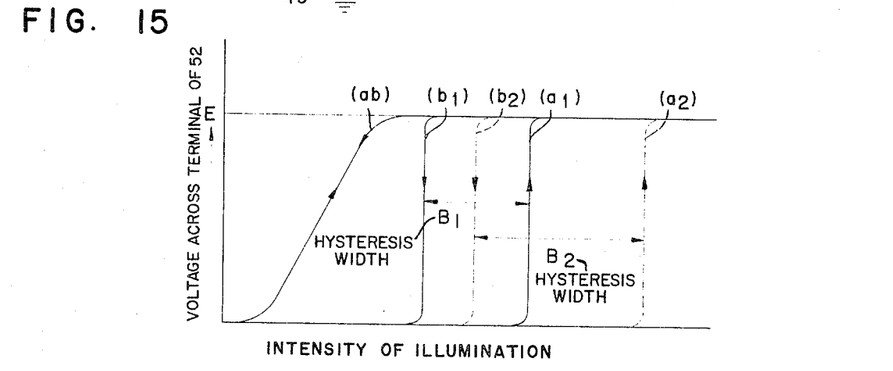
FIG. 15 is a graphical representation showing curves representing the relation between the resistance of a photo-conductor and the terminal voltage of an electromagnetic relay, presented to aid in the understanding of the operation of the device shown in FIG. 14.

FIG. 14 illustrates a modification of a photocell-controlled device in which said degree of feedback can be varied by varying the value of a resistor 49. In this case, the collector electrode of the transistor 55 is grounded through the resistor 49 so as to provide a fraction of the feedback voltage as determined by the variable resistor 49 to the base of the transistor 54. Thus, as indicated by the curve in FIG. 15, the photoelectric relay will merely have an amplifier effect when said fractional voltage is zero, but as the value of fraction is increased, a switching characteristic will be provided having sharp build-up and build-down as indicated by $a_1$ and $b_1$, respectively, which are spaced apart by a hysteresis width $B_1$. Upon further increase in the fraction of the feedback voltage, the spacing between the build-up point $a_2$ and the build-down point $b_2$ is caused to have a hysteresis width $B_2$ as shown in FIG. 15. Thus, the width of the operating hysteresis characteristics can be varied to any desired value by adjusting the resistor 49. It is clear that such a variable operating range is a simple and effective means to provide stable operations and to prevent unstable operation or chattering due to small variation in the intensity of illumination when the photocell-controlled device is used.

When the embodiments of FIGS. 13 and 14 are used as the photocell-controlled device 5, it is preferable to provide one resistor similar to the resistor 50 in each of the second photocell and third photocell, because in this case, sensitivity of the second photocell and that of the third photocell can be independently varied in every case in which the photocell-controlled device 5 is connected to the second photocell or to the third photocell. Particularly, in the case of FIG. 13, hysteresis range can be individually adjusted by providing a resistor such as 49 to each of the photocells.

Figure 16:
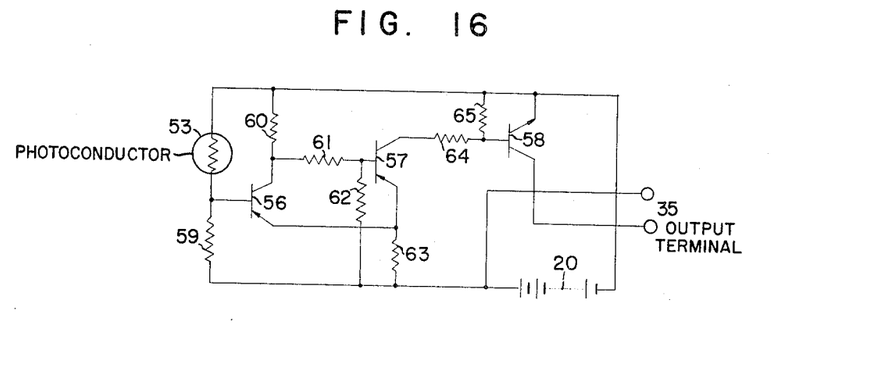
Figure 17:
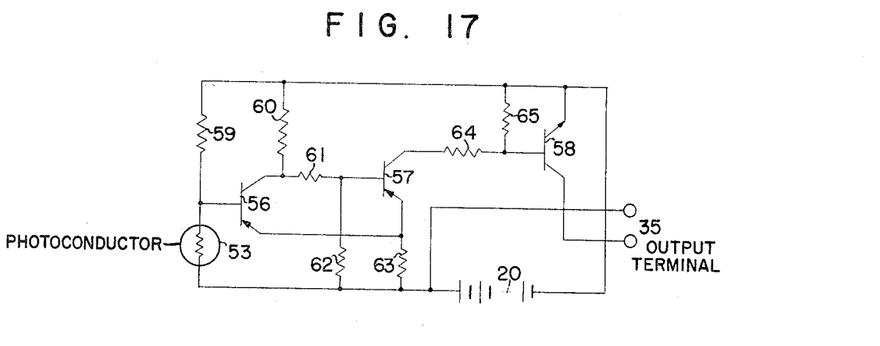

FIGS. 16 and 17 show modified photocell-controlled devices wherein the photoconductor 53 is connected on the input side of transistors 56 and 57 and resistors 60, 61, 62 and 63 forming a bistable multivibrator. Resistors 59, 64 and 65 and a complementary transistor 58 are connected as shown. In FIG. 16 the resistance of the photoconductor 53 increases as the intensity of illumination decreases to gradually increase the base potential of the transistor 56 until, finally, the transistor 56 is switched to cut off while the transistor 57 is switched to conduct. The transistor 58 is an amplifying transistor which is set to saturate when the transistor 57 conducts so as to energize an electromagnetic relay (not shown) which is connected across the output terminals 35. When the intensity of illumination is increased and hence when the resistance of the photoconductor 53 is decreased, the base potential of the transistor 56 is decreased, thereby to cause abrupt switching of the transistor 56 to the conductive state and the transistors 57 and 58 to the nonconductive state to deenergize the electric relay connected between the output terminals.

The modification shown in FIG. 17 operates in the following manner. Decrease in the intensity of illumination causes the transistor 56 to conduct and transistors 57 and 58 to cut off to deenergize the relay or output load connected across the output terminals 35, whereas increases in the intensity of illumination causes the transistor 56 to cut off and the transistors 57 and 58 to conduct, thereby causing energization of the output terminals 35.

In the photocell-controlled device of FIG. 16, the base potential of the transistor 56 is determined by resistance ratio of the resistor 39 and the photocell 53. When this is used as the second photocell-controlled device 5, it is desirable to connect resistors like the resistor 59 between the electric power source and another contact 6c of said switch 6 and between said source and another contact 6c of said switch 6, respectively, that is, it is preferable to connect resistors per one to the photocells 7 and 8, respectively, whereby it becomes possible to obtain the same base potential even when resistances of the photocells are somewhat different at their respective predetermined illuminations.

Figure 18:
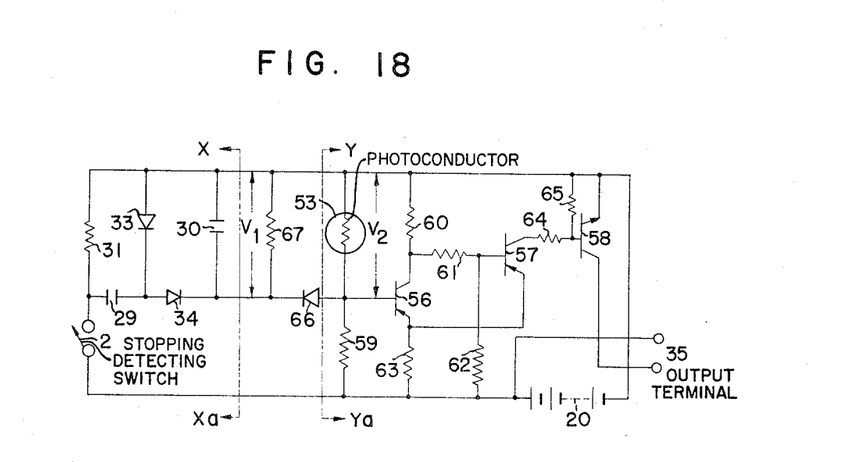
FIGS. 18, 19 and 20 are connection diagrams showing examples of a compound device which is controlled by the stopping condition of a car and the intensity of nighttime illumination according to this invention.
Figure 19:
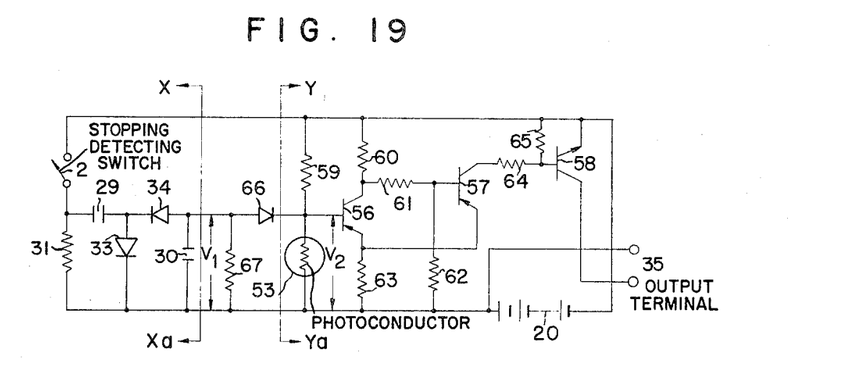
Figure 20:
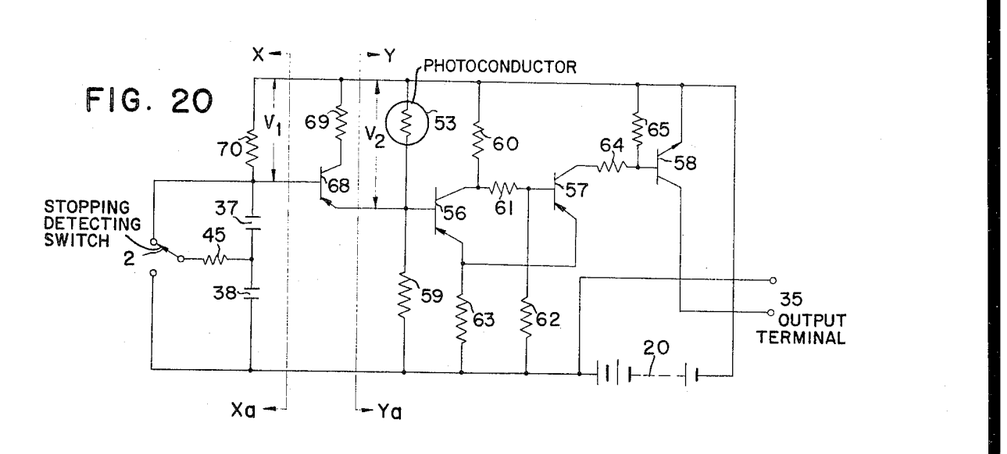

FIGS. 18, 19 and 20 show some examples of the compound device 9 constructed in accordance with this invention. In these figures, like parts are designated by the same reference characters as in the preceding embodiments. In FIGS. 18, 19 and 20, a stopping responsive section (indicated to the left of the line $x$—$x'$) is shown as connected to the input of the photocell-controlled relay section (indicated to the right of the line $Y$—$Y_a$) by way of a diode 66 or a transistor 68.

Referring at first to FIG. 18, while the car is running, the stopping detecting switch 2 of the stopping responsive section is operated to normally produce a voltage $V_1$ across a resistor 67 by the action of charging and discharging current of capacitors 29 and 30. When the car is stopping, and as the capacitor 29 or 30 charges or discharges, the voltage across the resistor 67 is decreased. It will now be assumed that the voltage between the base electrode of the transistor 56 and the negative pole of the battery 20, or the voltage across the photoconductor 53 is represented by $V_2$, that the voltage $v_2$, when the transistor 56 of the photocell-controlled relay section changes from off to on condition, is represented by $V_a$, that the voltage $V_2$, when the transistor 56 changes from on to off condition, is represented by $v_b$, that resistance values of the photoconductor 53 at the time of said transitions are $R_a$ and $R_b$, that $v_1$ is always larger than $v_b$, and that the value of the resistor 67 is selected to be lower than $R_a$. Then, when the car is running, the voltage $v_1$ is constantly generated, and, moreover, when the intensity of illumination to which the photoconductor 53 is subjected is high so that the voltage $v_2$ is lower than $v_a$, the transistor 56 is in the on condition, whereas the transistors 57 and 58 are in the off condition, thus deenergizing the electromagnetic relay connected across output terminals 35. On the other hand, when the intensity of illumination impinging upon the photoconductor 53 decreases so that $v_2$ becomes equal to $v_b$, then the transistor 56 becomes off, whereas transistors 57 and 58 become on, thereby passing the saturated current to energize the relay connected across the output terminal 35. In the above mentioned case, even when the voltage $v_2$ is lower than $v_b$, the voltage $v_1$ does not affect the input side to the base of the transistor 56 because of the reverse polarity of the diode 66. Also, even when the voltage $v_2$ is increased beyond $v_1$, which is larger than $v_b$, the current due to difference between $v_2$ and $v_1$ merely flows through the shunt resistor 67 by way of the diode 66, thus maintaining the transistor 56 in non-conducting state. If now the car is stopped, the voltage $v_1$ will disappear, whereby the resistor 67 will be connected in parallel with the photoconductor 53 through the diode 66. Thus, the voltage $v_2$ will never become higher than $v_a$, irrespective of the resistance value of the photoconductor 53 which is determined by the intensity of illumination. In other words, the transistor 56 is always in conductive state to maintain deenergized the relay connected across output terminals 35.

In the embodiment shown in FIG. 19, the photoconductor 53 is connected between the base electrode of the transistor 56 and the positive pole of the battery 20 instead of being connected between the base electrode of the transistor 56 and the negative pole of the battery as in the preceding embodiment. The embodiment shown in FIG. 19 operates similarly to the preceding embodiments except that the electromagnetic relay is energized when the intensity of illumination is high but is deenergized when the intensity of illumination is low. The embodiments shown in FIGS. 18 and 19 have the following operation. In the case wherein the stopping detecting section is detecting the running condition by utilization of the unidirectional conductive property of the diode 66 which is inserted between the stopping responsive section and the photocell-controlled relay section, the former provides a voltage across the resistor 67 to block the current flow from the photocell-controlled relay section, whereas when the stopping responsive section detects the condition of stop, the supply of voltage to the resistor 67 from the stopping responsive section is interrupted, thereby short-circuiting the opposite terminals of the photoconductor 53 through said resistor 67 to render inoperative the photocell-controlled relay section. In the following embodiment the diode is replaced by a transistor. In FIG. 20, a transistor 68 and its collector resistor 69 are provided between the stopping responsive section (shown to the left of the line x—x') and the photocell-controlled relay section (shown to the right of the line Y—Y$_a$), it being understood that symbols $v_1$, $v_2$, $v_a$, $v_b$, $R_a$ and $R_b$ have the same meaning as in the embodiments shown in FIGS. 18 and 19. When the car is running, the voltage $v_1$ is produced across the resistor 70 by the switching action of the switch 2 to elevate the base potential of the transistor 68 to a value sufficient to render it nonconductive. Accordingly, in this case the transistor 68 is nonconducting, regardless of the value of $v_2$, so that the photocell-controlled relay section has the normal response capability. Thus, increase in the intensity of illumination of the incident light results in a decrease in the resistance of the photoelectric conductor 53, and when $v_2$ reaches $v_a$, the transistor 56 conducts, whereas transistors 57 and 58 become non-conducting to deenergize the relay connected across output terminals 35. Decrease in the intensity of illumination of the light impinging upon the photoconductor 53 results in an increase in the resistance thereof, and when $v_2$ reaches $v_b$, the transistor 56 becomes nonconducting, whereas the transistor 57 becomes conductive. Since the complementary transistor 58 can carry the saturated current, the relay connected between output terminals 35 is energized.

As mentioned above, while the compound device can operate normally during the running of the car because of the cut-off characteristic of the transistor 68, when the operation of switch 2 ceases in response to car stopping, the current flowing through the resistor 70 decreases rapidly to decrease the voltage $v_1$ there across, so that a base current flows through to the transistor 68 to render it conductive. Under these conditions, inasmuch as the resister 69 is connected in parallel with the photoconductor 53 and has been adjusted to have a value less than $R_a$, transistor 56 is always conductive, while the transistors 57 and 58 are nonconductive to deenergize the relay connected across the output terminals 35. Thus, compound device 9 loses its response function. This embodiment is different from the embodiments shown in FIGS. 18 and 19 in that a transistor 68 is substituted for the diode 66 to fully utilize its cut-off characteristic in addition to its amplifying capability, so that it is possible to select a sufficiently large resistor 70 for the stopping responsive section and a sufficiently small resistor 69 for the collector side. Therefore, the device can operate accurately even when the output from the stopping responsive section is small.

As can be noted from the above description, this invention provides a novel fully automatic control device for illuminating lamps of vehicles, especially motor vehicles which can automatically control in a desired manner various lamps in response to running and stopping of a car, intensity of outdoor illumination, intensity of illumination of on-coming cars, and other conditions. Moreover, this invention provides photoelectric sensitive devices which can accurately respond to a predetermined intensity of illumination.

The "side lamps" named herein may be any kind of auxiliary illuminating provisions including parking lights.

While the invention has been described with respect to particular embodiments thereof, it will be apparent that improvements and modifications may be made without departing from the scope of the invention as defined in the appended claims.

What is claimed is:

1. A fully automatic control system for lighting lamps of a vehicle, including main and auxiliary head lamps, side lamps and tail lamps, which comprises, in combination, a first photocell-controlled device; a first photocell responsive to a predetermined nighttime illumination intensity value connected to said device; a second photocell-controlled device; a second and a third photocell connected to said second device; said second photocell responding to a predetermined twilight illumination value, and said third photocell responding to a predetermined illumination value produced by on-coming cars; a battery; electric power circuits, fed by said battery, for said devices; means for controlling said second device by said first device and, responding to a value lower than said predetermined twilight illumination intensity, lighting said side and tail lamps; responding to a value lower than said predetermined nighttime illumination intensity, continuously lighting said tail lamps; responding to a lower value than the predetermined illumination intensity of on-coming cars, lighting the main head lamps; and, responding to a higher value than the predetermined illumination intensity of on-coming cars, lighting the auxiliary head lamps.

2. The control system as defined in claim 1, wherein a stopping responsive device is provided detecting the difference between the running and stopping state of said vehicle; and an electric power circuit therefor; said stopping responsive device being connected to said first and second devices; said second device providing response produced by on-coming cars only in said running state; said first device responding to the values of predetermined twilight intensity and night time intensity and ceasing to light said head lamps when said vehicle is in stopped state.

3. The control system as defined in claim 2, wherein said stopping responsive device is provided with a transistor connected so at to close the electric power circuit of said first device when said transistor is conductive; and the operation of said second device is changed thereby.

4. The control system as defined in claim 2, wherein said first device is provided with a transistor connected so as to close the electric power circuit of said stopping responsive device when said transistor is conductive; and the operation of said second device is changed thereby.

5. The control system as defined in claim 2, wherein said stopping responsive device and said first device are replaced by a compound device consisting of a stopping responsive section, a photocell-controlled relay section, a photoconductor connected to said relay section, a first and second resistor, and a semiconductor; said first resistor being connected to said stopping responsive section and to said battery and producing a difference in potential at the terminals of said first resistor only when said vehicle is in running state, as detected by said stopping responsive section; said semiconductor being connected to one terminal of said photoconductor and one terminal of said first resistor and becoming nonconductive when said difference in potential is produced; said relay section operating in response to the value of the predetermined nighttime intensity of the impinging light of said photoconductor when said stopping responsive section detects the running state of said vehicle; and said relay section ceasing to operate in response to the load effect of said second resistor, connected in parallel with said photoconductor, when said stopping responsive section detects the stopped state of said vehicle.

6. The system as defined in claim 5, wherein said semiconductor is a diode.

7. The system as defined in claim 5, wherein said semiconductor is a transistor.

8. The control system as defined in claim 5, wherein said first and second devices are provided with a bistable multivibrator connected at its input side to said photoconductor, and with a complementary transistor amplifying the output of said multivibrator so that sharply responsive operation of said devices is attained even when the light impinging on the photoconductor is gradually varied.

9. The control system as defined in claim 2, wherein said stopping responsive device consists of at least two capacitors and a stopping detecting switch; said capacitors charging and discharging by the action of said switch which is repeatedly actuated by the running state of said vehicle; and said stopping device sending out charging and discharging currents flowing through said capacitors as output; whereby said device detects the running and stopping state of the vehicle.

10. The control system as defined in claim 9, wherein said currents are sent out through an amplifier.

11. The control system as defined in claim 1, wherein said first and second devices are provided with an amplifier and a resistor, said photocell in said devices being connected to the input side of the amplifier and the resistor connected to its output side so as to feed back positively a part of the amplifier output, thus facilitating sharp responsive characteristics of said photocell even when the light impinging thereon varies.

12. The control system as defined in claim 11, wherein said resistor is variable and the feedback varies accordingly, thereby rendering the hysteresis operating range of said amplifier adjustable.

References Cited by the Examiner
UNITED STATES PATENTS

| | | | |
|---|---|---|---|
| 1,951,495 | 3/1934 | Trafton | 315—79 |
| 2,678,430 | 3/1954 | Loescher | 315—79 X |
| 2,754,452 | 7/1956 | Onksen et al. | 250—214 |
| 2,807,752 | 9/1957 | McIlvaine | 250—214 |
| 2,983,844 | 5/1961 | Shano | 315—79 X |

RALPH G. NILSON, *Primary Examiner.*

J. D. WALL, *Assistant Examiner.*